United States Patent
Taslakian et al.

(10) Patent No.: US 11,580,363 B2
(45) Date of Patent: Feb. 14, 2023

(54) SYSTEMS AND METHODS FOR ASSESSING ITEM COMPATIBILITY

(71) Applicant: ELEMENT AI INC., Montreal (CA)

(72) Inventors: Perouz Taslakian, Montreal (CA); David Vazquez Bermudez, Montreal (CA); Guillem Cucurull Preixens, Montreal (CA)

(73) Assignee: SERVICENOW CANADA INC., Montreal (CA)

( * ) Notice: Subject to any disclaimer, the term of this patent is extended or adjusted under 35 U.S.C. 154(b) by 448 days.

(21) Appl. No.: 16/683,536

(22) Filed: Nov. 14, 2019

(65) Prior Publication Data

US 2020/0160154 A1     May 21, 2020

Related U.S. Application Data

(60) Provisional application No. 62/767,849, filed on Nov. 15, 2018.

(51) Int. Cl.
*G06N 20/00* (2019.01)
*G06N 3/04* (2023.01)
*G06N 3/08* (2023.01)

(52) U.S. Cl.
CPC ......... *G06N 3/0454* (2013.01); *G06N 3/0445* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 2017/0011279 A1* | 1/2017 | Soldevila | G06V 30/194 |
| 2019/0026917 A1* | 1/2019 | Liao | G06T 7/60 |
| 2019/0251446 A1* | 8/2019 | Fang | G06F 16/51 |
| 2019/0340649 A1* | 11/2019 | Ayush | G06V 10/507 |

(Continued)

OTHER PUBLICATIONS

Al-Halah et al., "Fashion Forward: Forecasting Visual Style in Fashion", IEEE International Conference on Computer Vision (ICCV), 2017, pp. 1-12.

(Continued)

*Primary Examiner* — Jakieda R Jackson
(74) *Attorney, Agent, or Firm* — BCF LLP

(57) ABSTRACT

A compatibility score generator implementing a neural network is trained for assessing compatibility of items. Elements of a feature vector representing each item and of a compatibility data structure indicating items considered compatible are retrieved. The neural network is trained using training data corresponding to the items and indicating compatibility between pairs of items. The compatibility data structure is modified by removing indications that items of a pair of items are compatible. An encoding function generating encoded representations for the items based on the compatibility data structure is evaluated. Encoded representations are provided to a decoder that learns a likelihood that the indication had been removed when modified. The neural network and the decoder are optimized based on a loss function that reflects the decoder's ability to correctly determine whether the indication had been removed. The encoded representations generate a compatibility score for at least two items of interest.

20 Claims, 12 Drawing Sheets

(56) References Cited

U.S. PATENT DOCUMENTS

2019/0362220 A1\* 11/2019 Yap .................. G06N 3/0454
2019/0378204 A1\* 12/2019 Ayush ............... G06Q 30/0643

OTHER PUBLICATIONS

Feng et al., "Interpretable Partitioned Embedding for Customized Fashion Outfit Composition", ResearchGate, arXiv:1806.04845v4 [cs.CV] Jun. 21, 2018, pp. 1-10.
Gilmer et al., "Neural Message Passing for Quantum Chemistry", arXiv:1704.01212v2 [cs.LG] Jun. 12, 2017, pp. 1-14.
Gori et al., "A New Model for Learning in Graph Domains", Proceedings. 2005 IEEE International Joint Conference on Neural Networks, 2005, pp. 1-6.
Hamilton et al., "Inductive Representation Learning on Large Graphs", 31st Conference on Neural Information Processing Systems (NIPS 2017), Long Beach, CA, USA, arXiv:1706.02216v4 [cs.SI] Sep. 10, 2018, pp. 1-19.
Han et al., "Learning Fashion Compatibility with Bidirectional LSTMs", arXiv:1707.05691v1 [cs.CV] Jul. 18, 2017, 9 pages.
He et al., "Ups and Downs: Modeling the Visual Evolution of Fashion Trends with One-Class Collaborative Filtering", arXiv:1602.015851 [cs.AI] Feb. 4, 2016, 11 pages.
Hoffer et al., "Deep Metric Learning Using Triplet Network", ICLR 2015, arXiv:1412.6622v4 [cS.LG]Dec. 4, 2018, pp. 1-8.
Hsiao et al., "Creating CapsuleWardrobes from Fashion Images", arXiv:1712.02662v2 [cs.CV] Apr. 14, 2018, 15 pages.
Kang et al., "Visually-Aware Fashion Recommendation and Design with Generative Image Models", arXiv:1711.02231v1 [cs.CV] Nov. 7, 2017, 10 pages.
McAuley et al., "Image-based Recommendations on Styles and Substitutes", arXiv:1506.04757v1 [cs.CV] Jun. 15, 2015, pp. 1-11.
Nakamura et al., "Outfit Generation and Style Extraction via Bidirectional LSTM and Autoencoder", arXiv:1807.03133v3 [cs.CV] Oct. 23, 2018, pp. 1-9.
Rostamzadeh et al., "Fashion-Gen: The Generative Fashion Dataset and Challenge", arXiv:1806.08317v2 [stat.ML] Jul. 30, 2018, 10 pages.
Schlichtkrull et al., "Modeling Relational Data with Graph Convolutional Networks", arXiv:1703.06103v4 [stat.ML] Oct. 26, 2017, 9 pages.
Shih et al., "Compatibility Family Learning for Item Recommendation and Generation", The Thirty-Second AAAI Conference on Artificial Intelligence (AAAI-18), 2018, pp. 2403-2410.
Tangseng et al., "Recommending Outfits from Personal Closet", arXiv:1804.09979v1 [cs.CV] Apr. 26, 2018, 9 pages.
Vasileva et al., "Learning Type-Aware Embeddings for Fashion Compatibility", arXiv:1803.09196v2 [cs.CV] Jul. 27, 2018, 66 pages.
Veit et al., "Learning Visual Clothing Style with Heterogeneous Dyadic Co-occurrences", arXiv:1509.07473v1 [cs.CV] Sep. 24, 2015, 9 pages.
Cucurull et al., "Context-Aware Visual Compatibility Prediction", arXiv:1902.03646v2 [cs.CV] Feb. 12, 2019, 10 pages.

\* cited by examiner (a) FITB example (b) FITB resampled example (c) FITB question as a graph

SYSTEMS AND METHODS FOR ASSESSING ITEM COMPATIBILITY

CROSS-REFERENCE

The present application claims priority from U.S. Provisional Patent Application No. 62/767,849, filed Nov. 15, 2018, the entirety of which is incorporated herein by reference.

FIELD

The present technology relates to systems and methods that facilitate item comparisons. In particular, the present technology relates to systems and methods for assessing the compatibility of the items.

BACKGROUND

Compatibility is a property that measures how well two items go together. The concept of compatibility is often confounded with that of similarity, although the two concepts are distinguishable. For example, two items might be considered similar because they have the same shape and color, but the items may not necessarily be compatible. Compatibility may be regarded as more subjective in nature, because whether or not two items are considered compatible can depend heavily on the observer and the context.

As an example, assessing fashion compatibility typically refers to the task of determining whether a set of fashion items go well together. In its ideal form, it involves understanding the visual styles of garments, being cognizant of social and cultural attitudes, and ensuring that when fashion items are worn together that the resulting "outfit" is aesthetically pleasing. This task is fundamental to a variety of industry applications such as personalized fashion design, outfit compilation, wardrobe creation, and fashion trend forecasting. That said, the task is also complex since it depends on subjective notions of style, context, and trend—properties that often vary from one individual to another, and that can evolve over time.

SUMMARY

The present technology is directed to systems and methods that facilitate, in accordance with at least one broad aspect, improved predictions of compatibility between items of interest.

In one broad aspect, there is provided a method of training a compatibility score generator for assessing compatibility of items, the compatibility score generator implementing a neural network for generating encoded representations of the items, the method being executable by at least one processor of a computer system, the method comprising: for each of a plurality of items, retrieving, from a memory of the computer system, elements of a feature vector representing the item; retrieving, from the memory of the computer system, elements of at least one compatibility data structure that indicates which items of the plurality of items are considered compatible with which other items from the plurality of items; and training the neural network using training data representable by an input graph having nodes and edges, each node of the input graph corresponding to one of the plurality of items, and each edge of the input graph indicating compatibility between a pair of items, the training data comprising: (i) for each of the plurality of items, the elements of the feature vector representing the item; and (ii) the at least one compatibility data structure; and wherein the training comprises: modifying the at least one compatibility data structure by removing at least one indication that items of a given pair of items are compatible, the modifying representable by a removal of at least one corresponding edge of the input graph; at each of at least one layer of the neural network, evaluating an encoding function having trainable parameters, the encoding function for generating a set of encoded representations for the plurality of items based on the at least one compatibility data structure; providing the set of encoded representations to a decoder that learns a likelihood that the at least one indication had been removed at the modifying; and repeating the evaluating and the providing while optimizing the neural network and the decoder based on a loss function, wherein the loss function reflects the decoder's ability to correctly determine whether the at least one indication had been removed at the modifying; and wherein the set of encoded representations generated at the training is usable to generate a compatibility score for at least two items of interest.

In another broad aspect, there is provided a method of computing a compatibility score associated with at least two items of interest from a plurality of new items, the method of computing a compatibility score comprising: for each of the plurality of new items retrieving, from a memory of the computer system, elements of a new feature vector representing the new item; retrieving, from the memory of the computer system, elements of at least one new compatibility data structure that indicates which new items of the plurality of new items, if any, are considered compatible with which other new items from the plurality of new items; wherein the plurality of new items are representable by a new input graph having nodes and edges, each node of the new input graph corresponding to one of the plurality of new items, and each edge of the new input graph indicating compatibility between a pair of new items; evaluating at least one encoding function of a trained compatibility score generator, the at least one encoding function for generating a set of new encoded representations for the plurality of new items based on the at least one new compatibility data structure; providing the set of new encoded representations to a decoder of the trained compatibility score generator, wherein the likelihood of compatibility of the at least two items of interest is computed by evaluating a distance function based on at least two respective new encoded representations associated with the at least two items of interest; and outputting a compatibility score based on the likelihood of compatibility of the at least two items of interest as computed by the decoder of the trained compatibility score generator.

In other aspects, various implementations of the present technology provide a non-transitory computer-readable medium storing program instructions for executing one or more methods described herein, the program instructions being executable by a processor of a computer-based system.

In other aspects, various implementations of the present technology provide a computer-based system, such as, for example, but without being limitative, an electronic device comprising at least one processor and a memory storing program instructions for executing one or more methods described herein, the program instructions being executable by the at least one processor of the electronic device.

In the context of the present specification, unless expressly provided otherwise, a computer system may refer, but is not limited to, an "electronic device", a "computing device", an "operation system", a "system", a "computer-based system", a "computer system", a "network system", a "network device", a "controller unit", a "monitoring device", a "control device", a "server", and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (e.g., CD-ROMs, DVDs, floppy disks, hard disk drives, etc.), USB keys, flash memory cards, solid state-drives, and tape drives. Still in the context of the present specification, "a" computer-readable medium and "the" computer-readable medium should not be construed as being the same computer-readable medium. To the contrary, and whenever appropriate, "a" computer-readable medium and "the" computer-readable medium may also be construed as a first computer-readable medium and a second computer-readable medium.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

Additional and/or alternative features, aspects and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
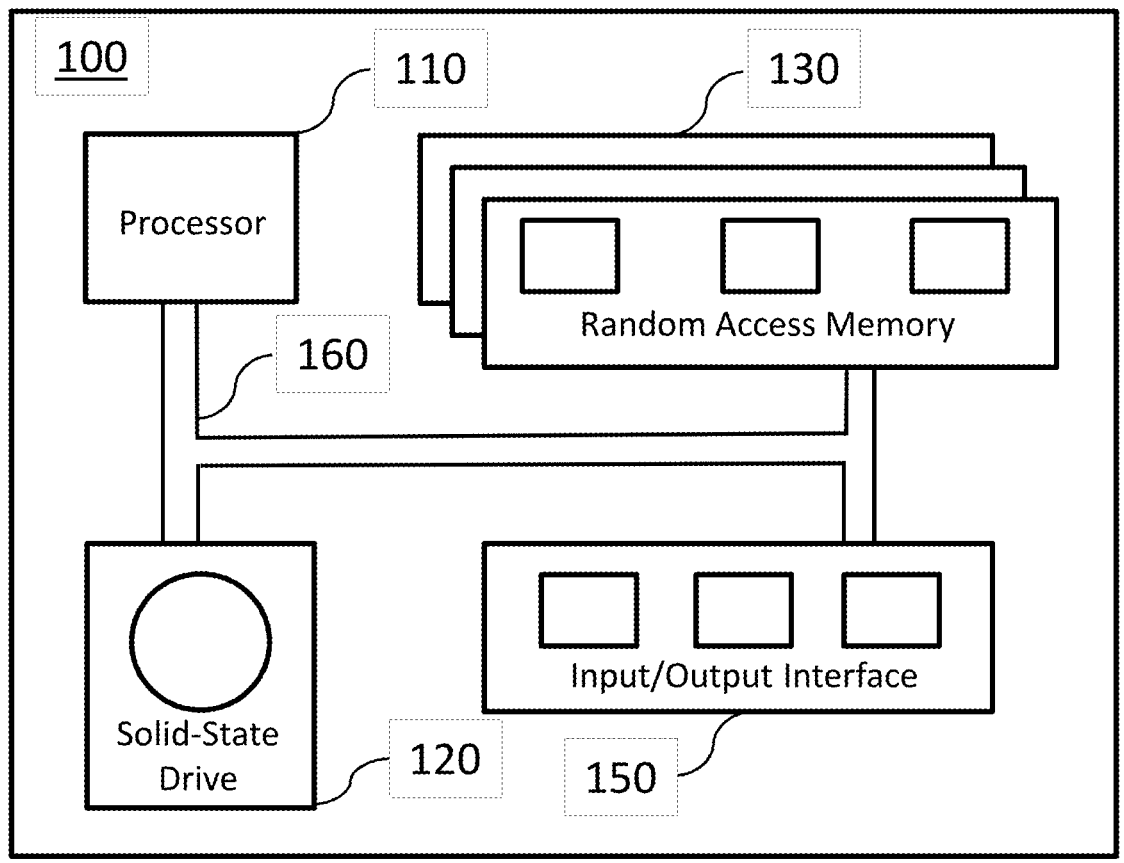
FIG. 1 is a block diagram of an example computing environment in accordance with at least one embodiment of the present technology.

Unless otherwise explicitly specified herein, the drawings ("Figures") are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that one or more modules may include for example, but without being limitative, computer program logic, computer program instructions, software, stack, firmware, hardware circuitry, or a combination thereof which provides the required capabilities.

With these fundamentals in place, we will now consider some non-limiting examples to illustrate various implementations of aspects of the present technology.

FIG. 1 illustrates a computing environment in accordance with an embodiment of the present technology, shown generally as 100. In some embodiments, the computing environment 100 may be implemented by any of a conventional personal computer, a computer dedicated to managing network resources, a network device and/or an electronic device (such as, but not limited to, a mobile device, a tablet device, a server, a controller unit, a control device, etc.), and/or any combination thereof appropriate to the relevant task at hand. In some embodiments, the computing environment 100 comprises various hardware components including one or more single or multi-core processors collectively represented by processor 110, a solid-state drive 120, a random access memory 130, and an input/output interface 150. The computing environment 100 may be a computer specifically designed to assess compatibility of items of interest, such as fashion items of interest. In some alternative embodiments, the computing environment 100 may be a generic computer system.

In some embodiments, the computing environment 100 may also be a subsystem of one of the above-listed systems. In some other embodiments, the computing environment 100 may be an "off-the-shelf" generic computer system. In some embodiments, the computing environment 100 may also be distributed amongst multiple systems. The computing environment 100 may also be specifically dedicated to the implementation of the present technology. As a person in the art of the present technology may appreciate, multiple variations as to how the computing environment 100 is implemented may be envisioned without departing from the scope of the present technology.

Those skilled in the art will appreciate that processor 110 is generally representative of a processing capability. In some embodiments, in place of one or more conventional Central Processing Units (CPUs), one or more specialized processing cores may be provided. For example, one or more Graphic Processing Units (GPUs), Tensor Processing Units (TPUs), and/or other so-called accelerated processors (or processing accelerators) may be provided in addition to or in place of one or more CPUs.

System memory will typically include random access memory 130, but is more generally intended to encompass any type of non-transitory system memory such as static random access memory (SRAM), dynamic random access memory (DRAM), synchronous DRAM (SDRAM), read-only memory (ROM), or a combination thereof. Solid-state drive 120 is shown as an example of a mass storage device, but more generally such mass storage may comprise any type of non-transitory storage device configured to store data, programs, and other information, and to make the data, programs, and other information accessible via a system bus 160. For example, mass storage may comprise one or more of a solid state drive, hard disk drive, a magnetic disk drive, and/or an optical disk drive.

Communication between the various components of the computing environment 100 may be enabled by a system bus 160 comprising one or more internal and/or external buses (e.g., a PCI bus, universal serial bus, IEEE 1394 "Firewire" bus, SCSI bus, Serial-ATA bus, ARINC bus, etc.), to which the various hardware components are electronically coupled.

The input/output interface 150 may allow enabling networking capabilities such as wire or wireless access. As an example, the input/output interface 150 may comprise a networking interface such as, but not limited to, a network port, a network socket, a network interface controller and the like. Multiple examples of how the networking interface may be implemented will become apparent to the person skilled in the art of the present technology. For example, but without being limitative, the networking interface may implement specific physical layer and data link layer standard such as Ethernet, Fibre Channel, Wi-Fi, Token Ring or Serial communication protocols. The specific physical layer and the data link layer may provide a base for a full network protocol stack, allowing communication among small groups of computers on the same local area network (LAN) and large-scale network communications through routable protocols, such as Internet Protocol (IP).

According to some implementations of the present technology, the solid-state drive 120 stores program instructions suitable for being loaded into the random access memory 130 and executed by the processor 110 for executing acts of one or more methods described herein, relating to assessing compatibility of items. For example, at least some of the program instructions may be part of a library or an application.

Figure 2:
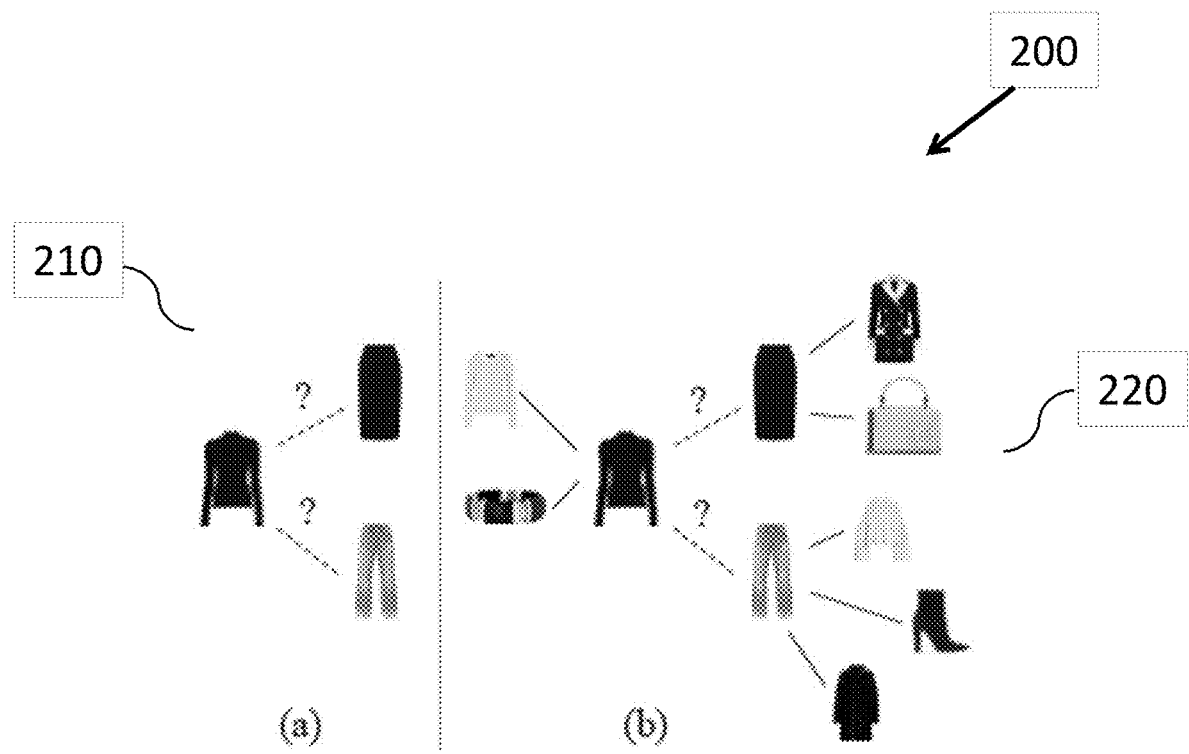
FIG. 2 is a diagram illustrating a comparison between aspects of a conventional technique for comparing items and aspects of the present technology in accordance with at least one embodiment, and with reference to an example application of the present technology.

Referring to FIG. 2, a diagram illustrating a comparison between aspects of a conventional technique for comparing items and aspects of the present technology in accordance with at least one embodiment is provided, shown generally as 200.

By way of example, consider the problem of compatibility as applied to a specific application of the present technology: fashion. As previously noted, the task of predicting fashion compatibility is complex. At least some conventional systems that attempted to address the problem of fashion compatibility prediction were based on models that primarily performed pairwise comparisons between items, as depicted by way of example at 210. The pairwise comparisons made between items may be based on item information such as image, category, description, etc. A potential disadvantage of these conventional approaches is that each pair of items being considered is typically treated independently of other items, with the final prediction of compatibility relying solely on comparisons of features between the two items considered in isolation.

Applicants recognized that such approaches, which may be regarded as ignoring the context in which a particular item is used, may cause a model to make the same compatibility prediction for any given pair of items. For example, if a model is trained to match a specific style of shirt with a specific style of shoes, it may consistently conclude that a shirt and shoes of those respective styles are compatible. However, this inflexibility may not realistically reflect whether a particular individual at a particular point in time, as an example, would consider those two items as compatible. The compatibility between a given shirt and pair of shoes would not only be defined by features of those items alone, but would also be biased by the individual's preferences and sense of fashion.

As compatibility is a subjective measure that can change with trends and across individuals, an improved method for predicting or otherwise assessing the compatibility of items may be desirable. In one broad aspect, Applicants teach a method for assessing compatibility of items based not only on visual features of each item, but also the "context" of each item. The context of a given item includes the set of other items (e.g., with regard to features of the other items) with which the given item is compatible, and potentially takes into account subjective individual biases and/or trends. The act of considering the context of a given item is depicted, by way of example, at 220.

In another broad aspect, Applicants teach a method that leverages the underlying relational information between items in an item collection to improve compatibility predictions. In respect of fashion items for example, an item collection may represent a defined fashion outfit, comprised of multiple fashion (e.g., clothing) items.

In another broad aspect, Applicants also recognized that graphs are particularly useful data structures that permit relational information on items to be captured, and accordingly, the context of items to be exploited. In at least one embodiment, fashion items and their pairwise compatibilities are represented as a graph, with vertices ("nodes") of the graph representing fashion items, and edges of the graph connecting pairs of fashion items that are considered to be compatible.

In another broad aspect, a graph-based neural network is used to learn and model relationships between items; in other words, in the graph domain, the neural network is trained to predict edges—potentially latent edges—between two arbitrary nodes. In at least one embodiment, there is provided a compatibility score generator for assessing the compatibility of items, based on a graph auto-encoder framework in the name of Kipf and Welling, entitled "Variational Graph Auto-Encoders" (2016), the contents of which are herein incorporated by reference.

The compatibility score generator described herein, in respect of at least one embodiment, comprises an encoder that computes encoded representations of items (i.e., item embeddings, or node embeddings in the graph domain) and a decoder that may be applied to the encoded representations of items to generate a measure of compatibility between items (e.g., for two given nodes, the likelihood there exists, or ought to exist, an edge between them in a graph comprising the two nodes). The decoder facilitates compatibility prediction by relating items to other items; this approach is distinguishable from item or product recommendation systems and methods that are designed to predict "compatibility" not between items directly, but rather between specific users (or e.g., segments of users) and items.

Moreover, by conditioning the embeddings of items on the presence of neighboring nodes in the graph domain, the style information contained in a learned encoded representation of an item may be made more robust (e.g., as compared to certain conventional methods that rely primarily on textual information regarding items in an attempt to generate improved embeddings for items), with more accurate item compatibility predictions being attainable.

Figure 3:
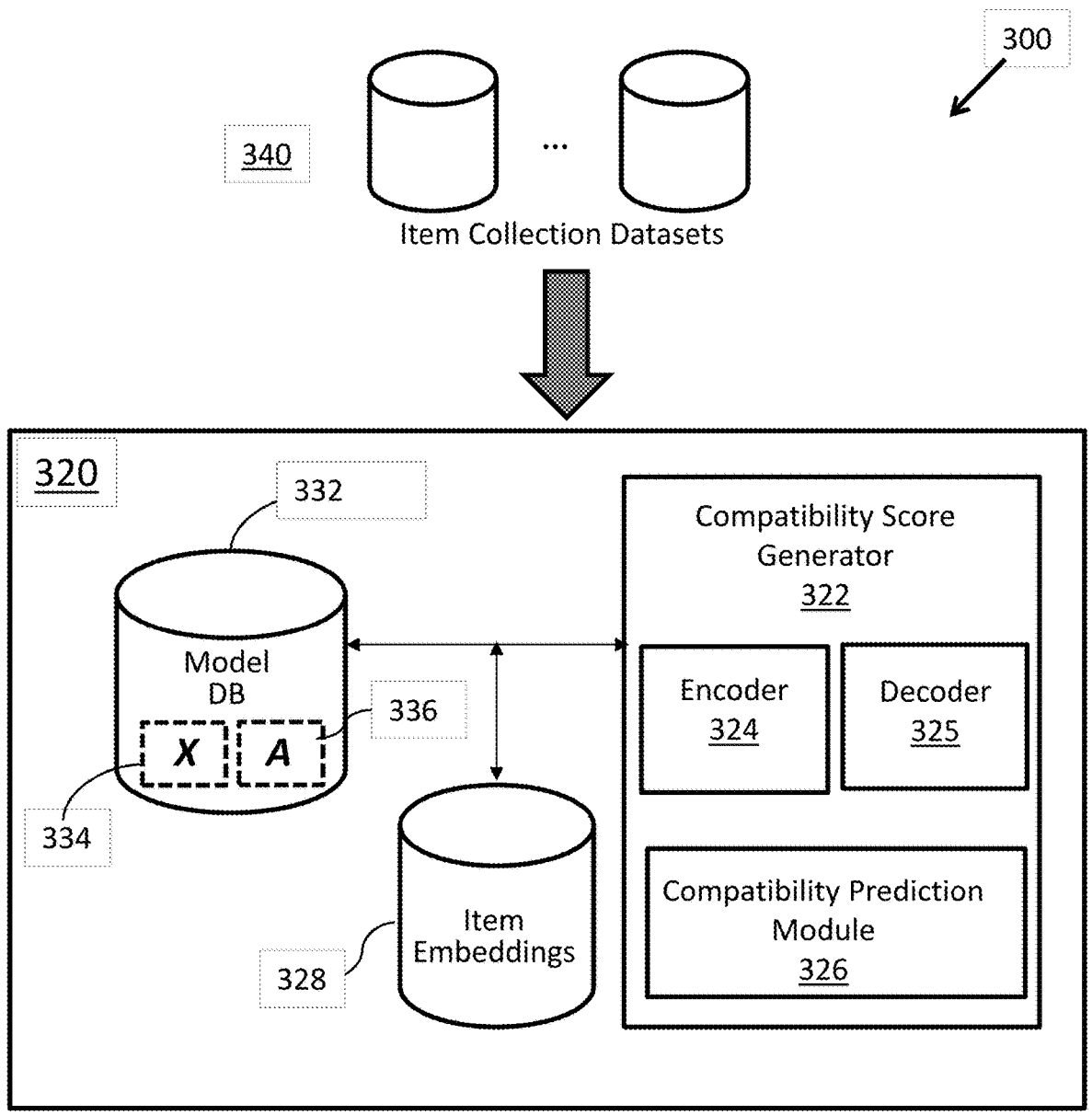
FIG. 3 is a block diagram illustrating a system comprising a compatibility score generator in accordance with at least one embodiment of the present technology.

Referring now to FIG. 3, there is provided a block diagram shown generally as 300 that illustrates an example system 320 comprising a compatibility score generator 322 in accordance with at least one embodiment of the present technology. Various aspects and features for components depicted in FIG. 3 may be described with reference to subsequent Figures, and the reader is directed to that disclosure for additional detail.

In some embodiments, system 320 may be implemented as a computing environment, such as the computing environment 100 of FIG. 1, running executable instructions defined in one or more software modules. In the example shown, system 320 comprises the compatibility score generator 322 for assessing the compatibility of items, which comprises an encoder 324 and decoder 325, the functionality of which will be described in detail below. Compatibility score generator 322 may also comprise, or be communicatively coupled with a compatibility prediction module 326 that is configured to predict the likelihood of items being compatible based on a trained model and/or by providing new input to one or more components of compatibility score generator 322 typically after compatibility score generator 322 has been trained.

A copy of item embeddings for items to be used in training (e.g., data to populate initial feature vectors for items) is storable in storage device 328. In certain implementations, the item embeddings stored in storage device 328 may reside on the same storage device where other data utilized by the compatibility score generator 322 resides, such as in a database 332. In the example shown in FIG. 3, data associated with a feature matrix (X) 334 and data associated with an adjacency matrix (A) 336 are stored in database 332; such data structures are described in further detail below. In variant implementations, data in storage device 328 and/or database 332 may be stored in whole or in part on one or more memories and/or storage devices remote from, but communicatively couplable to, system 320.

Figure 7:
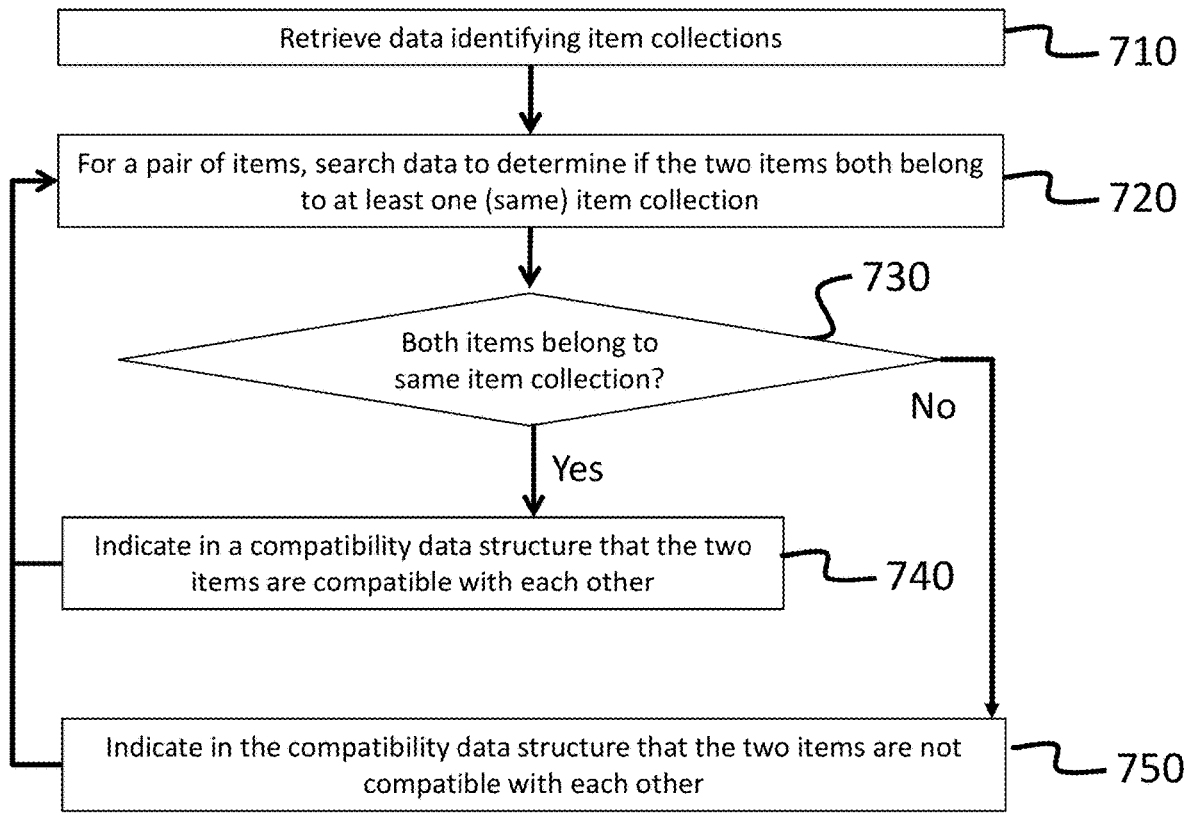
FIG. 7 is a flow diagram illustrating acts of a computer-implemented method of generating a compatibility data structure in accordance with at least one embodiment of the present technology.

To facilitate training of compatibility score generator 322, item collection datasets 340 may also be accessed (see e.g., FIG. 7 and the accompanying description). Data from item collection datasets 340 may be stored locally on system 320; the data may be stored in whole or in part on one or more memories and/or storage devices remote from, but communicatively couplable to, system 320. The data from item collection datasets 340 may be used to establish the "ground truth" in respect of compatibility of certain items. For example, the data in item collection datasets 340 may identify multiple fashion outfits (e.g., images of fashion outfits comprising multiple fashion items); when this data is used to train compatibility score generator 322, fashion items may be considered or otherwise deemed to be compatible with each other if they belong to the same fashion outfit (e.g., they are shown in the same fashion outfit image).

Figure 4:
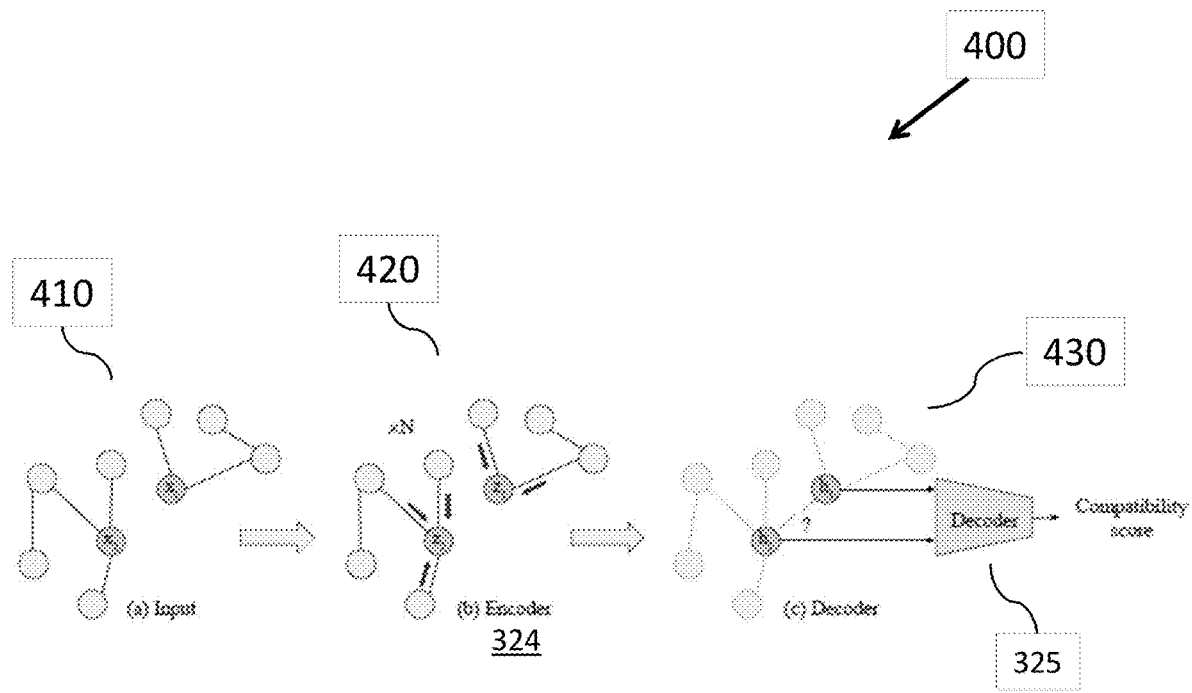
FIG. 4 is a diagram providing an overview of a method of generating a compatibility score in accordance with at least one embodiment of the present technology.

FIG. 4 is a diagram providing an overview, illustrated generally as 400, of a method of generating a compatibility score in accordance with at least one embodiment of the present technology. FIG. 4 depicts how the graph domain can be leveraged in the task of determining compatibility of items, such as fashion items when determining fashion compatibility by way of example. In particular, Applicants recognized this task may be posed as an edge prediction problem, leading to improved systems and methods that implement graph-based neural networks and that are both novel and inventive.

The depicted method utilizes an encoder 324, which computes new embeddings for each of multiple items in a manner that accounts for "connections" to other items (i.e., edges connecting a node representing a given item to other nodes representing other items), as well as a decoder 325 that generates a compatibility score for two items of interest. In the example shown in FIG. 4, $x_1$ and $x_2$ are nodes that represent two items of interest for which a measure of compatibility is desired. Input data that is to be processed in an execution of the method is representable as a graph, as shown at 410. After encoder 324 and decoder 325 has been trained, the compatibility of two items (represented by $x_1$ and $x_2$) within a new context as represented by input graph 410 can be determined by having the trained encoder 324 and decoder 325 process the new input data and output a compatibility score.

Accordingly, as depicted at 420, the encoder 324 computes the item embeddings associated with the nodes of the input graph 410 by using, in at least one embodiment, N graph convolutional layers that act to merge information from the respective neighbors of each node into the respective item embedding for each node. Then, as depicted at 430, the decoder 325 computes a compatibility score for nodes $x_1$ and $x_2$ using the item embeddings computed by the encoder 324 at 420.

In at least one embodiment, a graph-based neural network (e.g., a graph auto-encoder) forms the basis of a compatibility score generator (e.g., 322 of FIG. 3) that computes compatibility scores in accordance with one or more methods described herein. Once the neural network has been trained, the encoder can receive new data representable as a graph as input, the graph potentially having missing or latent edges. As noted above, the encoder produces an embedding for each item, each item being represented by a node of the graph. These embeddings are then used by the decoder to predict missing edges in the graph.

From a certain perspective, the process of computing embeddings for items may be considered as defining a point in a latent space for each item. This latent space can subsequently be used to determine whether two items are compatible based on where the two corresponding points are situated within the latent space. In particular, to obtain these latent representations (i.e., the item embeddings), the foregoing encoder can be employed, which takes into account information about an item's neighbors. In the examples provided herein involving fashion items, a given item's neighbor is some other item that has been considered compatible with the given item (e.g., they appeared together in the same fashion outfit deemed to comprise compatible fashion items, for which data was used in the training of the encoder). In at least one embodiment, the encoder implements a convolutional neural network trained to learn these latent representations, with each layer of the convolutional neural network extending the potential neighborhood of items that are considered (e.g., to incorporate information on items that are known to be compatible with items that are, in turn, known to be compatible with the given item, and so on). Subsequently, the foregoing decoder can be employed to obtain the latent representations for any two items of interest (potentially in an entirely new context involving other items) and assess how likely they are compatible, a determination that depends on how close the corresponding points are within the latent space.

Considering further the concept of compatibility and the encoder-decoder model in the graph domain, let G=(V, E) be an undirected graph with N nodes i∈V and edges (i, j)∈E connecting pairs of nodes. Each node in the graph is represented with a vector of F features ("feature vector") $\vec{x} \in \mathbb{R}^F$, and $X=\{\vec{x}_0, \vec{x}_1, \ldots, \vec{x}_{N-1}\}$ is a $\mathbb{R}^{N \times F}$ matrix (e.g., 334 of FIG. 3) that contains the features of all nodes in the graph. Each row of X, denoted as $X_{i,:}$ contains the features of one node, i.e., $X_{i,0}, X_{i,1}, \ldots, X_{i,N-1}$ represent the features of the i-th node. The connections between nodes are represented in an adjacency matrix $A \in \mathbb{R}^{N \times N}$ In general the adjacency matrix can represent both weighted and unweighted edges. In the example implementations described herein, the graphs comprise unweighted edges but not weighted edges ("unweighted graphs"), although in variant implementations the graphs may comprise only weighted edges or a combination of both weighted and unweighted edges. In the case of unweighted graphs, $A_{i,j}=1$ if there exists an edge between nodes i and j, and $A_{i,j}=0$ otherwise.

An objective of the model is to learn an encoding function $f_{enc}$, where $H=f_{enc}(X, A)$, and a decoding function $f_{dec}$, where $A=f_{dec}(H)$. The encoder 324 transforms the initial features X into a new representation $H \in \mathbb{R}^{N \times F'}$, depending on the structure defined by the adjacency matrix A. This new matrix follows the same structure as the initial matrix X, so the i-th row $H_{i,:}$ contains the new features for the i-th node. Then, the decoder 325 uses the new representations to reconstruct elements of the adjacency matrix A. This whole process may be regarded as encoding the input features to a new space, where the distance between two points can be mapped to the probability of whether or not an edge exists between them. The decoder 325 computes this probability using the features of each node: $p((i,j) \in E)=f_{dec}(H_{i,:}, H_{j,:})$, which in accordance with embodiments described herein represents the compatibility between items i and j. In this manner, the model, which is trained to determine whether a given item is compatible with another, takes into account more contextual information as compared to conventional techniques that simply consider visual features of a pair of items of interest in isolation to determine compatibility.

In at least one embodiment, encoder 324 is a graph convolutional network and the decoder 325 learns a metric to predict the compatibility score between pairs of items (i, j). Further details in respect of the encoder 324 and decoder 325 in accordance with a number of example embodiments follow.

Encoder

From the perspective of the i-th node, encoder 324 transforms elements of the corresponding feature vector $\vec{x}_i$ into a new representation $\vec{h}_i$. In one embodiment, at least some elements of the feature vector $\vec{x}_i$ or its corresponding new representation $\vec{h}_i$ are associated with visual properties of the represented item, such as those that may be gleaned from visual inspection of the item and/or from an image of the item, including the shape, color, and/or size of the item, as examples. In certain implementations, some features may be engineered so that each element corresponds to a specific property of the item. In certain implementations, some features may be engineered based on non-visual properties of the item (e.g., text description, item usage, etc.), although in other implementations the features of feature vector $\vec{x}_i$ may be restricted to visual features.

In at least one embodiment, some or all features of feature vector $\vec{x}_i$ (also referred to as "initial features" associated with the item) are based on an output of another neural network (not shown in FIG. 4) that is employed as a feature extractor. For example, a convolutional neural network (CNN) can be trained on a certain dataset of images (e.g., even images potentially of a different type or otherwise unrelated to the items for which compatibility may be assessed). The trained CNN can then be used to generate "features" for an item, namely encoded representations generated from an input image (e.g., of the item), that are extracted as output values from a layer of the trained CNN. These features can then be used to populate the feature vector $\vec{x}_i$ for the associated item. In at least one example implementation, a pre-trained neural network (e.g., a pre-trained CNN), potentially trained on a large image dataset (e.g., ImageNet), can be used in this manner as a feature extractor. For example, a CNN that implements a residual neural network (ResNet) architecture may be employed, such as ResNet50. Other models that may be employed can include, without limitation, Xception, VGG16, VGG19, InceptionV3, InceptionResNetV2, MobileNet, DenseNet, NASNet, MobileNetV2, etc.

The features initially extracted for an item, however, will typically only encode or otherwise capture properties associated with that particular item, independent of any other items. Applicants recognized the potential benefits of incorporating additional "structural" or relational information (e.g., other items that the given item is compatible with) into the encoded representations of an item, as previously discussed. In other words, an improved method of assessing item compatibility as compared to conventional methods may be achieved by generating new encoded representations for each node, representing an item, such that those encoded representations will contain information about not only itself but also its neighbors $N_i$, where $N_i = \{j \in V | A_{i,j} = 1\}$ denotes the set of nodes connected to node i. Therefore, the encoder 324 learns a function that effectively aggregates information in the local neighborhood around a node in generating the encoded representations for that node: $\vec{h}_i = f_{enc}(\vec{x}_i, N_i)$: $\mathbb{R}^F \rightarrow \mathbb{R}^{F'}$ thus includes neighborhood information in the learned representations.

In at least one embodiment, the encoder 324 implements a deep Graph Convolutional Network (GCN) that can have several hidden layers. The final value of $\vec{h}_i$ is a composition of the functions computed at each hidden layer, where each hidden layer produces hidden activations $\vec{z}_i^{(l)}$. A single layer takes the following form:

$$\vec{z}_i^{(l+1)} = ReLU\left(\vec{z}_i^{(l)} \Theta_0^{(l)} + \sum_{j \in N_i} \frac{1}{|N_i|} \vec{z}_j^{(l)} \Theta_1^{(l)}\right) \quad (1)$$

where $\vec{z}_i^{(l)}$ is the input of the i-th node at layer l, and $\vec{z}_i^{(l+1)}$ is its output. In its matrix form, the function operates on all the nodes of the graph at the same time:

$$Z^{(l+1)} = ReLU\left(\sum_{s=0}^{S} \tilde{A}_s Z^{(l)} \Theta_s^{(l)}\right) \quad (2)$$

Here, $Z^{(0)} = X$ for the first layer. $\tilde{A}_s$ is a normalized s-th step adjacency matrix, where $A_0 = I_N$ contains self-connections, and $A_1 = A + I_N$ contains first-step neighbors with self-connections. The normalized adjacency matrix is computed as $\tilde{A} = D^{-1}A$, normalizing it row-wise using the diagonal degree matrix $D_{ii} = \Sigma_j A_{i,j} \cdot \Theta_s^{(l)}$ contains the trainable parameters, and is a $\mathbb{R}^{F \times F'}$ ($\mathbb{R}^{F' \times F'}$ in the hidden layers). Context information is controlled by the parameter S, which represents the depth of the neighborhood that is being considered at each layer during training; more formally, the neighborhood at depth S of node i is the set of all nodes that are at a distance (number of edges traveled) at most s from i. In one example implementation, S is set equal to 1, meaning that for each layer, only neighbors at depth one are considered. However in variant implementations, S may be set to a value greater than one. In any event, the effective neighborhood of a node for which contextual information is being incorporated will depend not only on S, but also on the number of layers of the GCN. For example, if the GCN has three layers and S is set equal to 1, on the forward pass the GCN will perform three propagation steps, effectively convolving the third-order neighborhood of every node (i.e., all nodes up to 3 "hops" away).

In variant embodiments, one or more regularization and/or other techniques to improve the performance of the neural network may be employed, as is known or may become known in the future. Some examples include, without limitation, batch normalization, dropout, and weight regularization at each layer.

In at least one embodiment, a regularization technique is applied to the matrix A, consisting of randomly removing all the incident edges of some nodes with a probability $p_{drop}$. This technique introduces some changes in the structure of the graph, potentially making the trained model more robust against changes in structure. It may also train the model to perform well for nodes that do not have neighbors, potentially making the model more robust to scenarios with low relational information.

Decoder

In at least one embodiment, decoder 325 implements a function that computes the probability that two nodes, representing two corresponding items, are connected. This scenario may be considered an application of metric learning, where the goal is to learn a notion of similarity or compatibility between data samples. As previously noted, however, similarity and compatibility are not exactly the same. Similarity measures may be used to quantify how alike two items are, whereas compatibility measures may be used to quantify how well the two items go together.

In its general form, metric learning can be defined as learning a function $d(\cdot, \cdot)$: $\mathbb{R}^N \times \mathbb{R}^N \rightarrow \mathbb{R}_0^+$ that represents the distance between two N-dimensional vectors. For at least some applications of the embodiments described herein, the decoder 325 is configured to model the compatibility between pairs of items; it is desirable that the output of $d(\cdot, \cdot)$ be bounded by the interval [0,1].

In at least one embodiment, given the representations of two nodes $\vec{h}_i$ and $\vec{h}_j$ as computed by encoder 324, decoder 325 outputs a probability p that these two nodes are connected by an edge:

$$p = \sigma(|\vec{h}_i - \vec{h}_j| \vec{\omega}^T + b) \quad (3)$$

where $|\cdot|$ denotes absolute value, and $\vec{\omega} \in \mathbb{R}^{F'}$ and $b \in \mathbb{R}$ are learnable parameters. $\sigma(\cdot)$ is the sigmoid function that maps a scalar value to a valid probability value bounded by the interval (0,1).

The form of the decoder 325 described in Equation 3 may be regarded as a logistic regression decoder operating on the absolute difference between the two input vectors. The absolute value ensures the decoder 325 is symmetric, i.e., the output of $d(\vec{h}_i, \vec{h}_j)$ and $d(\vec{h}_j, \vec{h}_i)$ is the same, making it invariant to the order of the nodes. In variant embodiments, however, a different decoder may be used.

Training

In one broad aspect, the compatibility score generator 322 (FIG. 3) is trained to predict compatibility between items. During training, with A being the adjacency matrix associated with the items in graph domain, a subset of edges are randomly removed (this is distinguishable from any pre-processing where edges might have been removed as a form of regularization) to generate an incomplete adjacency matrix Â. The set of edges removed is denoted by $E^+$, as they represent positive edges, i.e., pairs of nodes $(v_i, v_j)$ such that $A_{i,j}=1$. In at least one embodiment, a set of negative edges $E^-$, which represent pairs of nodes $(v_i, v_j)$ that are not connected (i.e., items that are not compatible) are also randomly selected. In some implementations, the number of positive edges and the number of negative edges to be identified may be set to be equal. The compatibility score generator 322 would then be trained to predict the collective set of edges $E_{train}=(E^+, E^-)$ that contain both positive and negative edges. Training the compatibility score generator 322 to predict both positive and negative edges may assist in preventing the model from learning that all nodes are connected to each other. Therefore, given the incomplete adjacency matrix Â and the initial features for each node X, the decoder 325 predicts the edges defined in $E_{train}$, and the underlying model is optimized by minimizing the cross entropy loss between the predicted edges and their ground truth values, which is 1 for the edges in $E^+$, and 0 for the edges in $E^-$.

After training, Algorithm 1, shown below, illustrates certain tasks of an example method for computing a compatibility score given two items, using the aforementioned encoder 324 or decoder 325 in accordance with at least one implementation (see also FIG. 2 and the accompanying description). Persons skilled in the art will understand that variations and modifications of the tasks may be made without departing from the scope of the embodiments defined herein.

Algorithm 1 Compatibility prediction between nodes

Figure 5:
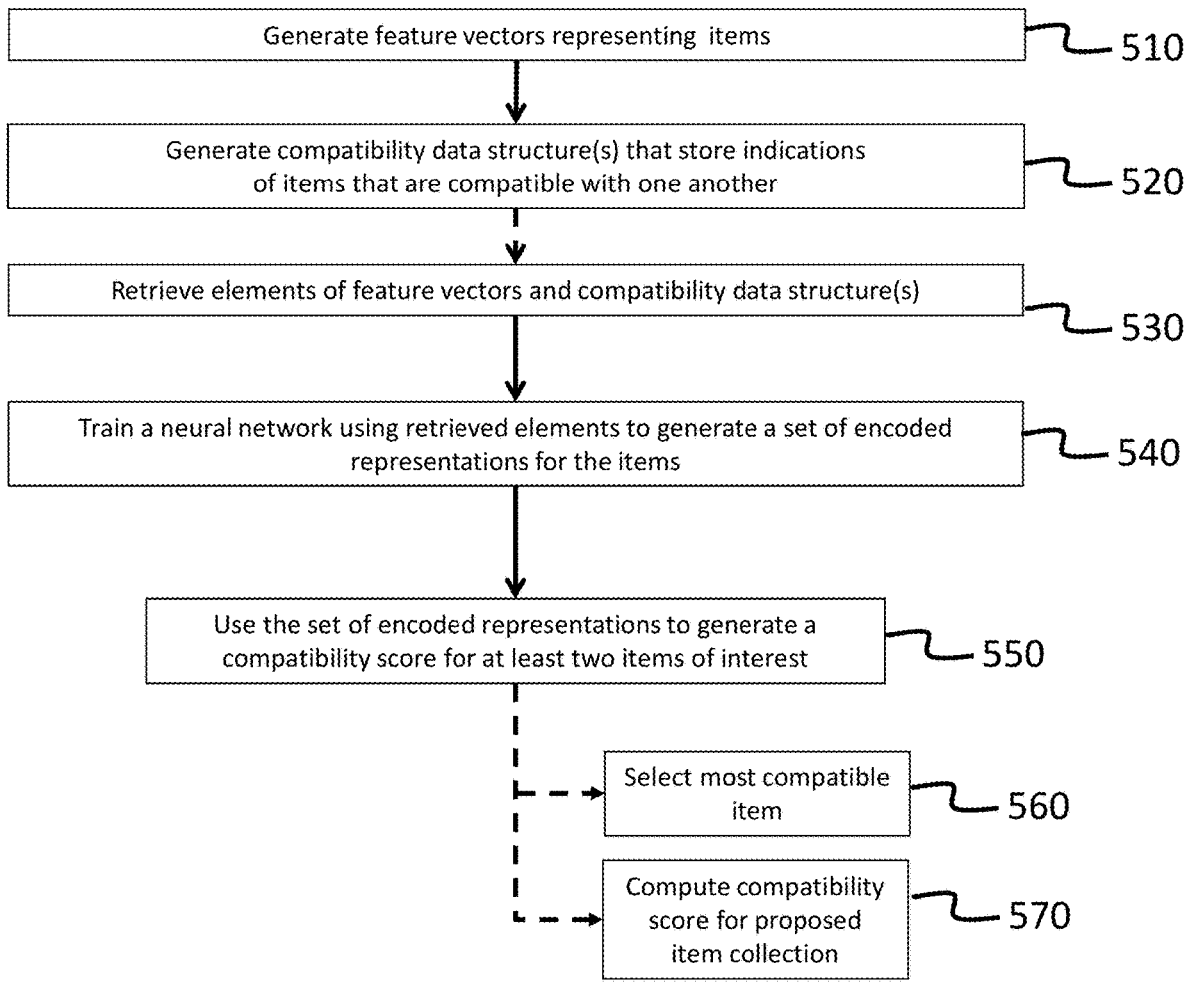
FIG. 5 is a flow diagram illustrating acts of a computer-implemented method of assessing compatibility of items, implementing at least one embodiment of the present technology.

Input:
    X - Feature matrix of the nodes
    A - Adjacency matrix of nodes relations
    (i, j) - Pairs of nodes for assessing compatibility
Output: The compatibitity score p between nodes i and j
1:    L = 3    ▷ Use 3 graph convolutional layers
2:    S = 1    ▷ Consider neighbours 1 step away
3:    H = ENCODER (X, A)
4:    p = DECODER (H, i, j)
5:    function ENCODER (X, A)
6:        $A_0, A_1 = I_L, I_L + A$
7:        $\tilde{A}_1 = D^{-1} A_1$    ▷ Normalize the adj. matrix
8:        $Z^{(0)} = X$
9:        for each layer 0, ..., L − 1 do
10:
$$Z^{(l+1)} = ReLU\left(\sum_{s=0}^{S} \tilde{A}_s Z^{(l)} \Theta_s^{(l)}\right)$$
11:        end for
12:       return $Z^{(L)}$
13:    end function Algorithm 1 Compatibility prediction between nodes 14:    function DECODER(H, i, j)
15:        return $\sigma\left(|H_{i,:} - H_{j,:}| \omega^T + b\right)$
16:    end function Referring now to FIG. 5, there is provided a flow diagram illustrating acts of a computer-implemented method of assessing compatibility of items, implementing embodiments of the present technology, and shown generally as 500. Certain aspects of FIG. 5 and subsequent Figures may have been previously described, primarily with reference to FIG. 4, and the reader is directed to that disclosure for additional detail.

In respect of certain embodiments where images of items are processed, method 500 may also be regarded as a method for classifying images representing items, the classifying being an assessment of compatibility between the items.

In one or more embodiments, any of the methods depicted in FIGS. 5 to 8, or one or more acts thereof, may be performed by a computer system, comprising one or more computing devices or entities. For example, portions of the respective method may be performed by components of the computing environment 100 (FIG. 1), such as one or more processors. Any of the methods depicted in FIGS. 5 to 8, or one or more steps thereof, may be embodied in computer-executable instructions that are stored in a computer-readable medium, such as a non-transitory computer-readable medium. Certain acts or portions thereof in the flow diagrams may be omitted or changed in order.

At 510, for each of multiple items, a feature vector representing the item is generated. The multiple items may consist of items that will be used to train a compatibility score generator (e.g., 322 of FIG. 3). In at least one embodiment, the feature vector encodes visual information about each item. At 510, acts of a computer-implemented method of generating feature vectors representing items as described in FIG. 6 may be performed. The generated feature vectors may be stored in a memory of the computer system, and later retrieved from the memory for use. A feature matrix X (e.g., 334 of FIG. 3) may be formed from the feature vectors for the plurality of items, and employed as previously described with respect to certain embodiments.

At 520, one or more compatibility data structures may be generated. Collectively, the one or more compatibility data structures store indications of items that are compatible with one another, which can include indications of items that have been deemed and/or otherwise considered to be compatible with one another. In at least one embodiment, the compatibility of items may be based on their presence within a pre-defined item collection, deemed to be composed of compatible items (e.g., a fashion outfit comprising compatible fashion items). At 520, acts of a computer-implemented method of generating a compatibility data structure as described in FIG. 7 may be performed. The generated compatibility data structure(s) may be stored in a memory of the computer system, and later retrieved from the memory for use. In at least one embodiment, the one or more compatibility data structure may form an adjacency matrix A (e.g., 336 of FIG. 3).

At 530, the feature vectors generated at 510 and the compatibility data structure(s) generated at 520, are retrieved or otherwise accessed, for further processing. In certain implementations, these vectors and data structures may have been pre-generated remotely (in terms of space and/or time) from its current use at a given computing device by the compatibility score generator.

At 540, a neural network is trained using the feature vectors and compatibility data structure(s) retrieved at 530, to generate a set of encoded representations for multiple items (e.g., training items). Through the training of the neural network, both the properties of the items (e.g., as reflected in the feature vectors) and the relationships between items (e.g., as reflected in the compatibility data structure(s)) are taken into account when generating the set of encoded representations. The training data, comprising the feature vectors and the compatibility data structure(s), are representable by an input graph having nodes and edges, with each node corresponding to an item, and each edge indicating compatibility of a pair of items. The neural network may be a convolutional neural network. The neural network may be a graph-based convolutional neural network. The neural network may be a graph convolutional network (GCN). The neural network will typically comprise at least one hidden layer.

The encoding function for a first layer of the neural network may be based on an adjacency matrix A formed from the compatibility data structure(s) and on a feature matrix X formed from the feature vectors; the encoding for a subsequent layer may be based on the adjacency matrix A and on output from a preceding layer (see e.g., Equations (1) and (2)). Accordingly, the resultant set of generated encoded representations will be a composition of the encoding function evaluated at each layer of the neural network.

Figure 8:
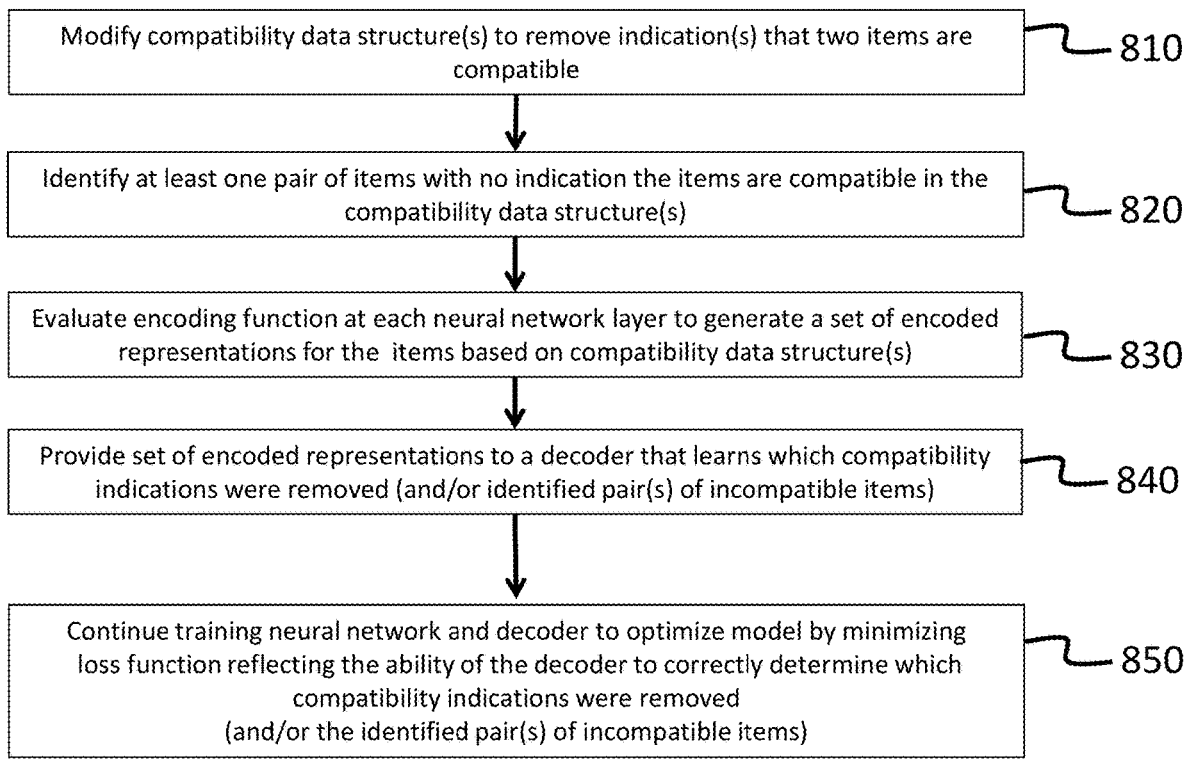
FIG. 8 is a flow diagram illustrating acts of a computer-implemented method of training a compatibility score generator for assessing compatibility of items in accordance with at least one embodiment of the present technology.

Moreover, at 540, acts of a computer-implemented method of training the compatibility score generator as described in FIG. 8 may be performed.

At 550, after the neural network is trained at 540, the generated (and learned) set of encoded representations can be used to generate a compatibility score for at least two items of interest (also referred to herein as "new items" or "test items" of interest), as may be desirable for certain tasks or applications. For example, given a "new context" comprising multiple new items and any known indications of compatibility between the new items, the corresponding data (e.g., X, A) can be provided as input to a trained encoder for generating encoded representations for each new item; subsequently, the decoder is usable to generate a compatibility score for any two of the new items (although this may be repeated for multiple pairs of new items depending on the task).

Some examples of tasks where the compatibility of items is to be determined include, without limitation: selecting the item from a set of proposed items that is most compatible with another set of identified items (e.g., a "Fill in the Blank" task) as shown at 560; and determining a level of compatibility among multiple items in a proposed item collection (e.g., an "Item Collection Compatibility" task) as shown at 570. To facilitate further understanding of such tasks, details of example applications relating to fashion will be described later in this specification with reference to FIGS. 9 and 10.

Figure 6:
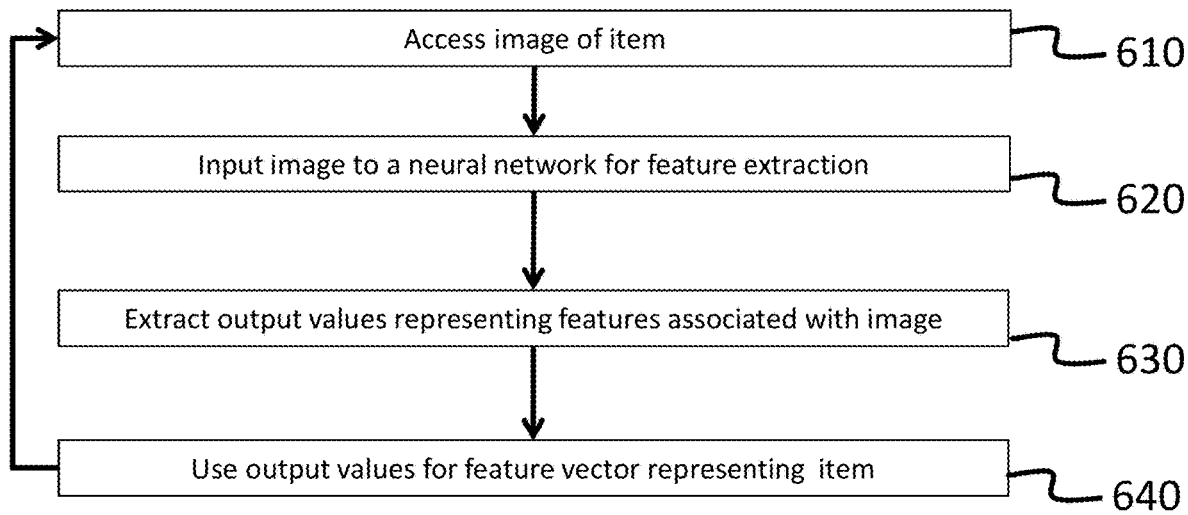
FIG. 6 is a flow diagram illustrating acts of a computer-implemented method of generating feature vectors representing items in accordance with at least one embodiment of the present technology.

As previously identified, FIG. 6 is a flow diagram illustrating acts of a computer-implemented method of generating feature vectors representing items in accordance with at least one embodiment of the present technology, and shown generally as 600. These acts may be considered sub-acts of 510 of FIG. 5, with respect to at least one particular example embodiment.

At 610, an image of an item (e.g., an item that will be used in the training of a neural network) is accessed. At 620, the image is input to a neural network for the purposes of feature extraction (this neural network also referred to herein as a "feature extraction neural network"). In this manner, features for an item may be automatically generated from an image of (or containing) the item. The neural network used for the purposes of feature extraction will typically be a separate neural network from that of the compatibility score generator which is trained to generate new encoded representations taking into account the compatibility between items (e.g., by processing elements of an adjacency matrix). The neural network used for feature extraction may be a convolutional neural network. The neural network used for feature extraction may implement a residual neural network (ResNet) architecture (e.g., ResNet50). The neural network used for feature extraction may have been pre-trained on a dataset comprising a plurality of images (e.g., ImageNet). At 630, output values from the neural network used for feature extraction are extracted, and used as elements of a feature vector representing the item at 640. The acts of the method 600 may be repeated for multiple items. In some implementations, method 600 may be employed to generate features for items other than training items (e.g., items used in a validation and/or a test phase, items used during an "in-use" or deployment phase of a trained compatibility score generator, etc.).

As previously identified, FIG. 7 is a flow diagram illustrating acts of a computer-implemented method of generating a compatibility data structure in accordance with at least one embodiment of the present technology, and shown generally as 700. These acts may be considered sub-acts of 520 of FIG. 5, with respect to at least one particular example embodiment.

For training the neural network that takes, at least in part as input, elements of at least one data structure (e.g., one or more compatibility data structures, an adjacency matrix, etc.) that represents relationships between items and thus indicate which items are compatible with others (or put another way, elements of a data structure that encodes contextual information relating to item compatibility), training data will typically be provided that can form a baseline (e.g., "ground truth") as to which items are compatible with which other items. For this purpose, data identifying collections of multiple items deemed or otherwise considered to be compatible may be retrieved at 710.

At 720, for a given pair of items, the data retrieved at 710 is searched to determine if the two items belong to the same item collection. For instance, in fashion applications, each item collection might represent a fashion outfit composed of various fashion items that are deemed to be compatible because they belong to the same outfit. If two items are both found together as part of at least one outfit, they are considered to be compatible. Accordingly, if two items are determined to belong to the same item collection at 730, then at 740, an indication that the two items are compatible is made in a compatibility data structure (e.g., an adjacency matrix); otherwise, the two items are not determined to belong together to any item collection, and the flow of method 700 proceeds to 750 in which an indication that the two items are not compatible with each other may be made in the compatibility data structure. Acts 720 to 750 may be repeated for further pairs of items. In certain implementations, an explicit indication of non-compatibility may not be immediately made in the compatibility data structure at 750, if the absence of such an express indication in one or more compatibility data structures (as might be made at 740) would suffice to allow a later determination or inference of the non-compatibility of a given pair of items.

In some embodiments, the data that identifies multiple item collections may originate from a dataset comprising multiple images, where one or more items are depicted in each image, and wherein each image (or a pre-identified group of images) defines one item collection comprising compatible items (e.g., one image per item collection).

In some other embodiments, the data that identifies multiple item collections may originate from a dataset comprising other data defining multiple "matched" items. This data may comprise indication of which items are compatible (in the sense that the items have been matched), and a search of matched items may be performed in order to generate various item collections. The data defining the multiple matched items may comprise, for example, images and/or text.

As previously identified, FIG. 8 is a flow diagram illustrating acts of a computer-implemented method of training a compatibility score generator for assessing compatibility of items in accordance with at least one embodiment of the present technology, and shown generally as 800. These acts may be considered sub-acts of 540 of FIG. 5, with respect to at least one particular example embodiment.

At 810, one or more compatibility data structures are modified by removing at least one indication that items of a certain pair of items are compatible. The removals may be made randomly. As previously described, these may be regarded as positive edges between nodes representing items in the graph domain. At 820, at least one pair of items for which no indication of compatibility was provided in the compatibility data structure(s) (e.g., as the compatibility data structure(s) existed prior to the removal of indications at 810) are also identified; these may be regarded as negative edges between nodes representing items in the graph domain. The identified pairs of non-compatible items may be selected at random. The number of positive and negative edges to be selected may be set to be the same. The number of positive and/or the number of negative edges to be selected may be set in accordance with an adjustable parameter.

At 830, an encoding function is evaluated at each neural network layer to generate a set of encoded representations for items, which by virtue of the consideration of the one or more compatibility data structures, will be improved in that relational information will be embedded or otherwise accounted for in the encoded representations.

At 840, the set of encoded representations are provided to a decoder that learns which compatibility indications were removed at 810 as well as the pairs of items identified as not being compatible at 820. Put another way, the decoder is trained to learn to correctly identify the positive (and negative) edges, and thus uncover the potentially latent connections representing compatibility between items.

At 850, the neural network and decoder continues to be trained (e.g., for a certain number of training epochs, or other stopping criteria), in which the underlying model is optimized by minimizing a loss function (e.g., cross-entropy loss) reflecting the ability of the decoder to correctly identify the positive and negative edges at 840.

Figure 9:
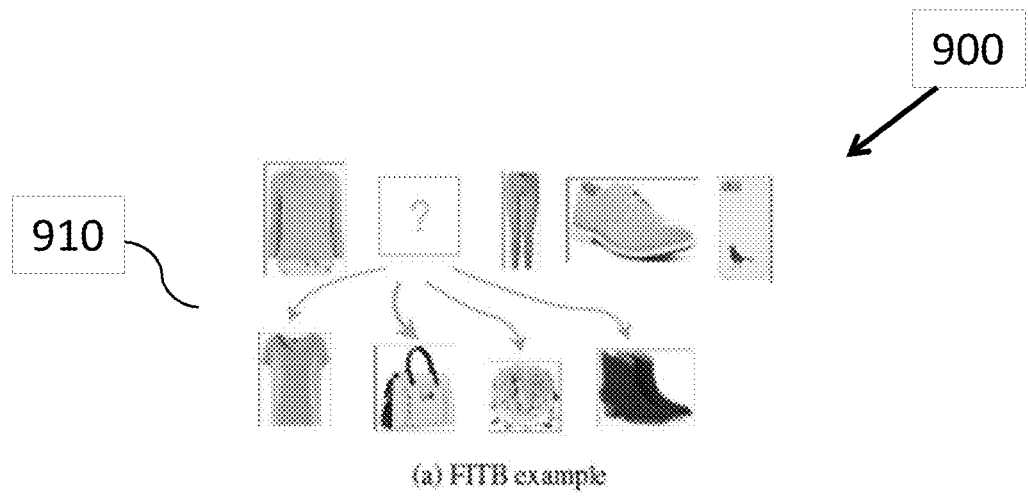
FIG. 9 is a diagram associated with a first example application of at least one embodiment of the present technology.
Figure 9:
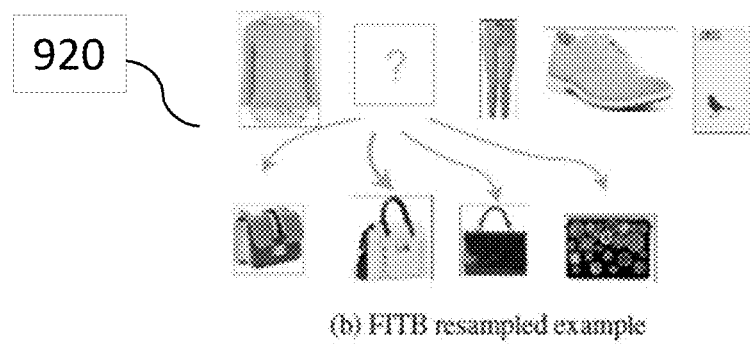
Figure 9:
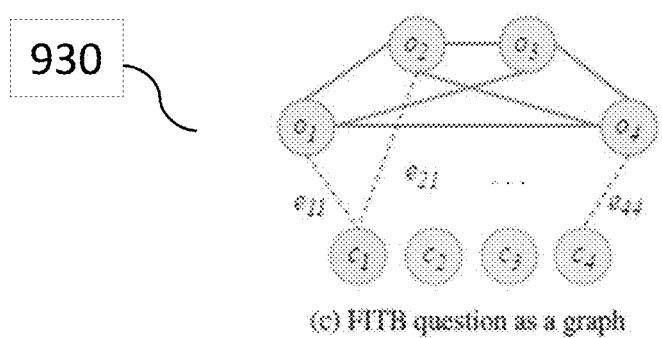
Figure 10:
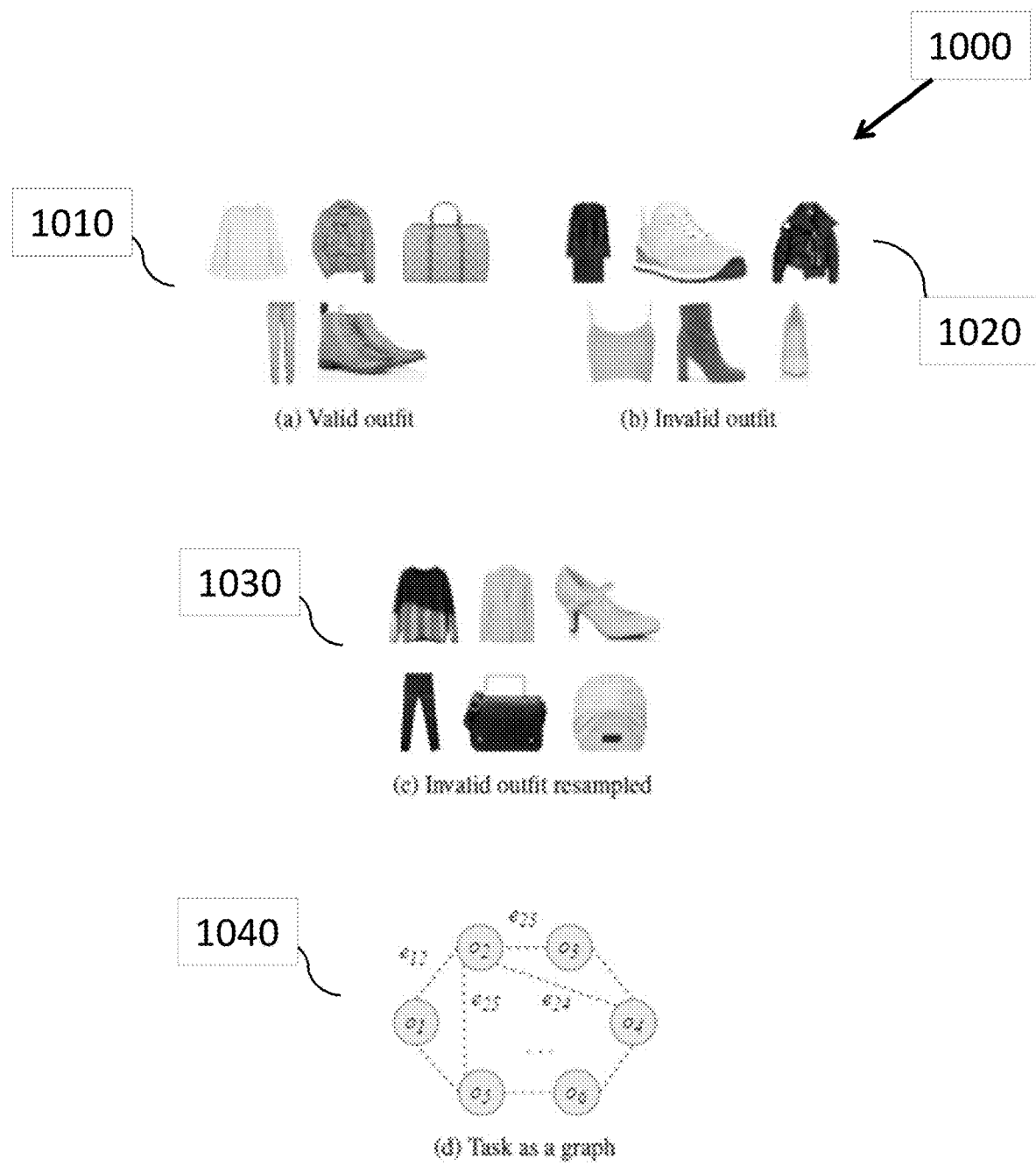
FIG. 10 is a diagram associated with a second example application of at least one embodiment of the present technology.

To facilitate further understanding of embodiments described herein, a number of example applications relating to fashion will now be described with reference to FIGS. 9 and 10. These examples are provided for illustration purposes only, and are not intended to be limiting. Although embodiments described herein may be applied to assess or otherwise determine the compatibility of fashion items, they can also be applied to other types of items for which it may be desirable to assess or determine compatibility (e.g., furniture items, consumer products, people based on images, etc.).

As previously noted, an item collection may define a set of items considered to be compatible. In fashion applications, the Polyvore dataset and the Fashion-Gen outfits dataset are examples of datasets that may be used to define item collections referred to as outfits.

The Polyvore dataset is a crowd-sourced dataset created by the users of a website of the same name; the website allows its members to upload photos of fashion items, and to match them up into outfits. It contains a total of 164,379 items that form 21,899 different outfits, which can be split into training, validation, and test sets. The maximum number of items per outfit is 8, and the average number of items per outfit is 6.5. To construct a graph for each dataset split, two nodes are connected by an edge if they appear in the same outfit.

Fashion-Gen is a dataset of fashion items collected from an online platform that sells luxury goods from independent designers. Each item has images, descriptions, attributes, and relational information. One key difference between the relations in Fashion-Gen and Polyvore is that in the former, relations are defined by professional designers and adhere to a general theme, while Polyvore's relations are generated by a broad range of web users with different tastes and varied notions of compatibility. Outfits may be formed by sets of clothing items that are connected together, and may have, for instance, between 3 and 5 items. Seasonal information may be used to split the dataset by placing items from one year (e.g., 2014) in the validation and test sets, and leaving the remainder for the training set. In one implementation, training, validation, and test sets comprised 60,159, 2,683, and 3,104 outfits, respectively.

Two tasks were considered (see e.g., 560/570 of FIG. 5) and recast as graph edge prediction problems in an example implementation for fashion applications. Let $\{o_1, \ldots, o_{N-1}\}$ denote the set of N fashion items in a given outfit, and $e_{i,j}$ denote the edge between nodes i and j:

Fill In The Blank (FITB): The fill-in-the-blank task consists of choosing the item that best extends an outfit from among a given set of possible item choices. One FITB question may be defined for each test outfit. Each question consists of a set of items that form a partial outfit, and a set of possible choices $\{c_1, \ldots, c_{M-1}\}$ that includes the correct answer and M−2 randomly chosen items. An example of one of these questions is depicted in FIG. 9, shown generally as 900. The top row of 910 shows items from a partial outfit, while the bottom row of 910 shows possible choices for extending the partial outfit. 920 shows an optional resampling of items if no repetition of an item of the same type is desired. FITB is shown at 930 framed as an edge prediction problem, where the model first generates the probability of edges between item pairs ($o_i$, $c_j$) for all i=0, ..., N−1 and j=0, ..., M−1. Then, a compatibility score for each of the j choices may be computed as $\sum_{i=1}^{N-1} e_{i,j}$ and the one with the highest score is the item that is selected to be added to the partial outfit.

Item Collection Compatibility: For this type of task, which in a fashion application may be framed as an outfit compatibility prediction task, the goal is to produce a compatibility score for a proposed set of items. In the fashion example, the compatibility score represents how compatible the items forming a proposed outfit are. Scores close to 1 represent compatible outfits, whereas scores close to 0 represent incompatible outfits. An example of one of these questions is depicted in FIG. 10, shown generally as 1000. An example of a valid outfit is shown at 1010. If outfits are constructed by randomly selecting items, it may be desirable to resample items as shown in 1030 if an original sampling of items as shown in 1020 is considered invalid, possibly because of an undesired duplication of certain items of the same type. As shown at 1040, the task can be framed as an edge prediction problem where the model predicts the probability of every edge between all possible item pairs of the outfit; this means predicting the probability of $$\frac{N(N-1)}{2}$$

edges for each outfit. The compatibility score of the outfit may be calculated by computing the average over all pairwise edge probabilities:

$$\frac{2}{N(N-1)} \sum_{i=0}^{N-1} \sum_{j=i+1}^{N-1} e_{i,j}.$$

The FITB task may be evaluated by measuring whether or not the correct item was selected from the list of choices. The outfit compatibility prediction task may be evaluated using the area under the ROC curve for the predicted scores.

Figure 11:
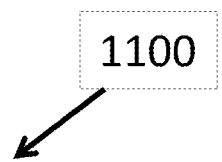
FIG. 11 is a diagram illustrating an aspect associated with evaluating the performance of the compatibility score generator in accordance with at least one embodiment of the present technology.
Figure 11:
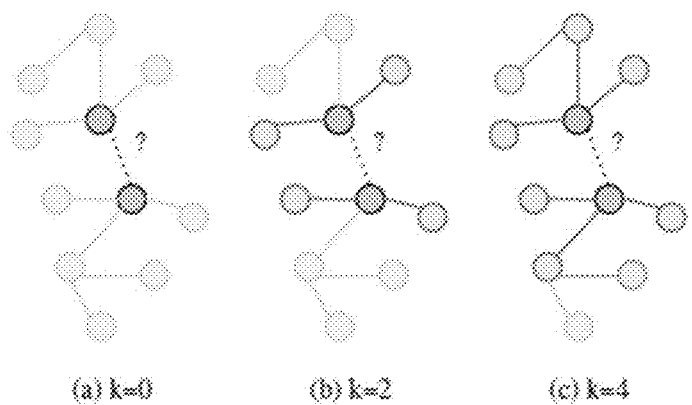

Neighborhood size may be taken into account when evaluating a model's performance: let the k-neighborhood of node i in a relational graph be the set of k nodes that are visited by a breadth-first-search process, starting from node i. In order to measure the effect of the size of relational structure around each item, during testing, each test sample contains the items and their k-neighborhoods, and the model can be evaluated at varying values of k. By way of illustration, consider FIG. 11 for example, which depicts varying k-neighborhoods surrounding two nodes of interest. When k=0, no relational information is used and the embedding of each item is based only on its own features. As the value of k increases, the embeddings of the items to be compared will be conditioned on more neighbors. In this example, consideration of the k-neighborhood is applied only at evaluation time; during training, all available edges are used.

In an example training scenario, a model was trained using the Adam optimizer, with a learning rate of 0.001 for 4,000 iterations with early stopping. Three graph convolutional layers were used, with S=1, and 350 units at each layer. Dropout of 0.5 was applied at the input of each layer and batch normalization at its output. The value of $p_{drop}$ applied to A was 0.15. The input to each node was comprised of 2048-dimensional feature vectors extracted with a ResNet50 from the image of each item, normalized to zero-mean and unit variance. A Siamese Network was also trained as a baseline for the Fashion-Gen dataset, which was trained with triplets of compatible and incompatible pairs of items. The network consisted of a ResNet50 pre-trained on Imagenet as the backbone, and the last layer was similar to the metric learning decoder previously described. Training was performed using Stochastic Gradient Descent (SGD) with an initial learning rate of 0.001 and a momentum of 0.9.

The results of an experiment are summarized in Tables 1 and 2 below. In general, it can be seen that accuracy increased with k, suggesting that as more neighborhood information is used, predictive accuracy increases.

TABLE 1

Polyvore Results, Polyvore results for both the FITB and the compatibility prediction tasks.

| Method | FITB Acc. | Compatibility AUC | FITB Acc.* | Compatibility AUC* |
|---|---|---|---|---|
| Siamese Network [33] | 54.2 | 0.85 | 54.4 | 0.85 |
| Bi-LSTM + VSE (512-D) [11] | 68.6 | 0.90 | 64.9 | 0.94 |
| CSN, T1: 1 + VSE + Sim + Metric [33] | 86.1 | 0.98 | 65.0 | 0.93 |
| Ours (k = 0) | 67.9 | 0.86 | 49.6 | 0.76 |
| Ours (k = 3) | 95.8 | 0.99 | 91.1 | 0.98 |
| Ours (k = 15) | 96.9 | 0.99 | 92.7 | 0.99 |
| Ours (k = 0)† | 60.7 | 0.69 | 45.0 | 0.64 |
| Ours (k = 3)† | 74.1 | 0.92 | 63.0 | 0.90 |
| Ours (k = 15)† | 85.8 | 0.93 | 79.5 | 0.92 |

*Resampled the FITB choices and the invalid outfits to make the task more difficult.
†Using only a subject of length 3 of the original outfit.

TABLE 2

Fashion-Gen Results. Results on the Fashion-Gen dataset for the FITB and compatibility tasks.

| Method | FITB Acc. | Compatibility AUC |
|---|---|---|
| Siamese Network | 56.3 | 0.69 |
| Ours (k = 0) | 47.9 | 0.72 |
| Ours (k = 3) | 56.3 | 0.84 |
| Ours (k = 15) | 68.7 | 0.90 |
| Ours (k = 30) | 71.6 | 0.91 |

Figure 12:
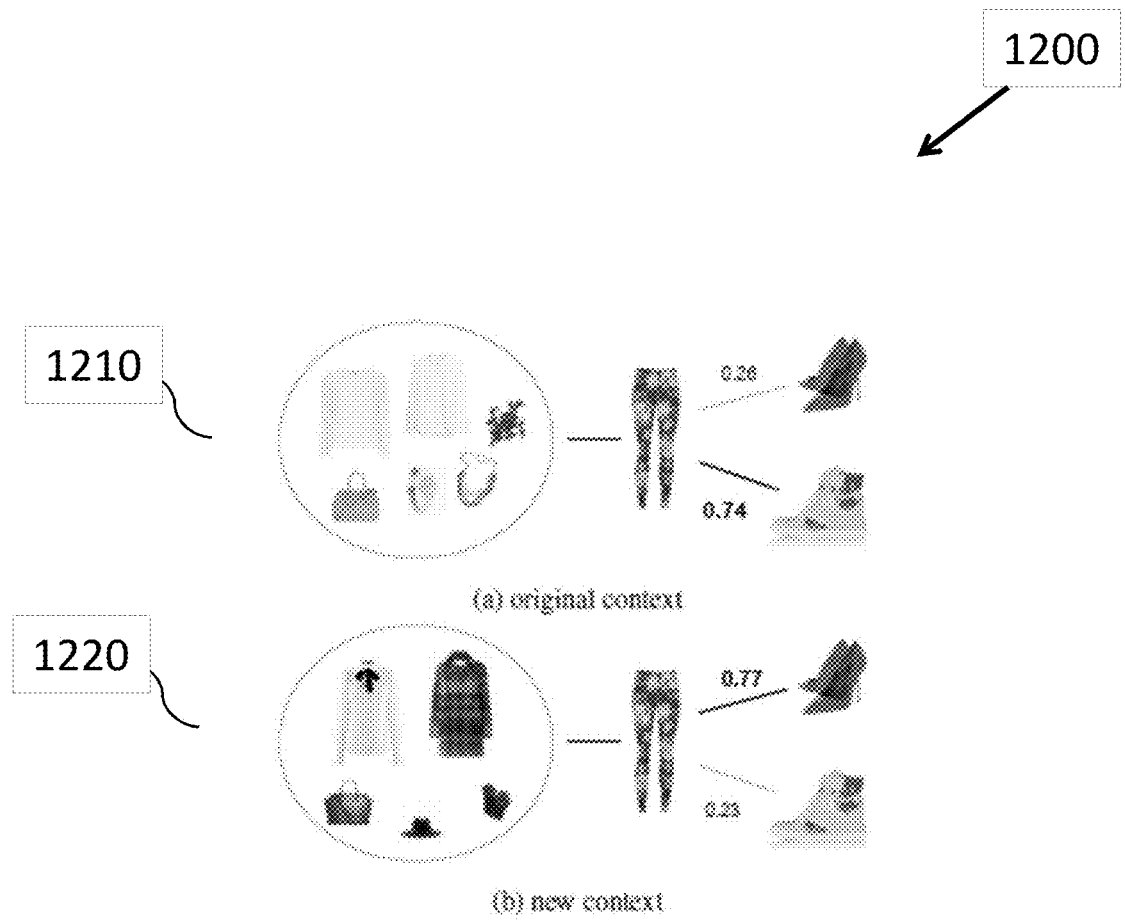
FIG. 12 is a diagram illustrating results from an example implementation of at least one embodiment of the present technology.

To better understand the role of an item's context that leads to this improvement in accuracy, reference is made to FIG. 12 in which example results involving the Polyvore dataset in respect of one implementation is shown generally as 1200.

In particular, FIG. 12 illustrates how the context of an item can influence its compatibility with another item. The compatibility predicted between a pair of trousers and each of two different pairs of shoes depends on the context, of which two are illustrated in 1200. The first figure shows the original context 1210 of the trousers, and the shoes selected (i.e., the shoes associated with the highest probability/score, 0.74 in the example shown) are the correct ones. However, if the context of the trousers is changed—that is, the trousers are to be matched to a different set of clothes as shown in 1220—the selected shoes, there, are determined to be the more formal pair (now having a score of 0.77 in the example shown, changed from 0.26 in the original context 1210), which match better with the new context, despite involving the same pair of pants.

While some of the above-described implementations may have been described and shown with reference to particular acts performed in a particular order, it will be understood that these acts may be combined, sub-divided, or re-ordered without departing from the teachings of the present technology. At least some of the acts may be executed in parallel or in series. Accordingly, the order and grouping of the act is not a limitation of the present technology.

It should be expressly understood that not all technical effects mentioned herein need be enjoyed in each and every embodiment of the present technology.

As used herein, the wording "and/or" is intended to represent an inclusive-or; for example, "X and/or Y" is intended to mean X or Y or both. As a further example, "X, Y, and/or Z" is intended to mean X or Y or Z or any combination thereof.

The foregoing description is intended to be exemplary rather than limiting.

Modifications and improvements to the above-described implementations of the present technology may be apparent to those skilled in the art.

What is claimed is:

1. A method of training a compatibility score generator for assessing compatibility of items, the compatibility score generator implementing a neural network for generating encoded representations of the items, the method being executable by at least one processor of a computer system, the method comprising:
for each of a plurality of items, retrieving, from a memory of the computer system, elements of a feature vector representing the item;
retrieving, from the memory of the computer system, elements of at least one compatibility data structure that indicates which items of the plurality of items are considered compatible with which other items from the plurality of items; and
training the neural network using training data representable by an input graph having nodes and edges, each node of the input graph corresponding to one of the plurality of items, and each edge of the input graph indicating compatibility between a pair of items, the training data comprising:
(i) for each of the plurality of items, the elements of the feature vector representing the item; and
(ii) the at least one compatibility data structure;
and wherein the training comprises:
modifying the at least one compatibility data structure by removing at least one indication that items of a given pair of items are compatible, the modifying representable by a removal of at least one corresponding edge of the input graph;
at each of at least one layer of the neural network, evaluating an encoding function having trainable parameters, the encoding function for generating a set of encoded representations for the plurality of items based on the at least one compatibility data structure;
providing the set of encoded representations to a decoder that learns a likelihood that the at least one indication had been removed at the modifying; and
repeating the evaluating and the providing while optimizing the neural network and the decoder based on a loss function, wherein the loss function reflects the decoder's ability to correctly determine whether the at least one indication had been removed at the modifying;
and wherein the set of encoded representations generated at the training is usable to generate a compatibility score for at least two items of interest.

2. The method of claim 1, wherein the neural network comprises a graph convolutional network (GCN), the graph convolutional network comprising at least one hidden layer.

3. The method of claim 1, wherein:
a feature matrix (X) is formable from the feature vectors for the plurality of items;
an adjacency matrix (A) is formable from the at least one compatibility data structure;
the encoding function for a first layer of the neural network is based on the adjacency matrix (A) and the feature matrix (X); and
the encoding function for a layer of the neural network other than the first layer is based on the adjacency matrix (A) and output from a preceding layer of the neural network;
wherein the set of encoded representations for the plurality of items is a composition of encoding functions evaluated at the at least one layer of the neural network.

4. The method of claim 1, further comprising: for each of the plurality of items, generating the feature vector representing the item, wherein the feature vector encodes visual information about the item; and storing the feature vector in the memory of the computer system.

5. The method of claim 4, wherein for each of the plurality of items, the generating the feature vector representing the item comprises:
accessing an image of the item;
inputting the image of the item to a second neural network;
extracting output values from a layer of the second neural network; and
using the output values as elements of the feature vector representing the item.

6. The method of claim 5, wherein the second neural network comprises a convolutional neural network.

7. The method of claim 6, wherein the second neural network implements a residual neural network (ResNet) architecture.

8. The method of claim 5, wherein the second neural network has been pre-trained on a dataset comprising a plurality of images.

9. The method of claim 1, further comprising:
retrieving data that identifies a plurality of item collections; and
storing elements in the at least one compatibility data structure to indicate that two items are considered compatible with each other where the data identifies that the two items belong to a same item collection.

10. The method of claim 9, wherein the data that identifies the plurality of item collections originates from a dataset comprising a plurality of images, wherein in each of the plurality of images at least one item is depicted, and wherein each of the plurality of images defines one of the plurality of item collections.

11. The method of claim 9, wherein the data that identifies the plurality of item collections originates from a dataset comprising a plurality of matched items, wherein the method further comprises executing a search of the matched items to define the plurality of item collections.

12. The method of claim 1, wherein the edges of the input graph are unweighted.

13. The method of claim 1, wherein the edges of the input graph are undirected.

14. The method of claim 1, wherein the training further comprises:
identifying, from the at least one compatibility data structure, at least one pair of items for which there is no indication that the items of the pair are compatible, the identifying representable by a non-presence of at least one corresponding edge of the input graph;
wherein the loss function reflects the decoder's ability to correctly determine that the at least one pair of items, as identified at the identifying, for which there is no indication that the items of the pair are compatible, are unlikely to be compatible.

15. The method of claim 1, wherein the decoder is configured to determine the likelihood of compatibility of two selected items by evaluating a distance function based on a first encoded representation associated with one of the two selected items and on a second encoded representation associated with one other of the two selected items.

16. The method of claim 15, wherein the distance function comprises an absolute distance function having learnable parameters.

17. The method of claim 1, wherein for each given indication in the at least one compatibility data structure that items of a given pair of items are compatible, the given indication is randomly removed prior to the modifying with an identified probability ($p_{drop}$).

18. The method of claim 1, wherein the compatibility score for at least two items of interest is computable to determine which item from a set of proposed items is considered most compatible with a second set of identified items.

19. The method of claim 1, wherein the compatibility score for at least two items of interest is computable that represents a level of compatibility among items in a proposed item collection.

20. A computer-implemented compatibility score generator for assessing the compatibility of items, comprising:
   at least one processor; and
   a non-transitory computer-readable medium;
   wherein the compatibility score generator implements a neural network for generating encoded representations of the items; and
   wherein the non-transitory computer-readable medium comprises instructions which, upon execution by the at least one processor, cause the at least one processor to train the compatibility score generator in accordance with the method of claim 1.

* * * * *